Dec. 23, 1969  M. H. CUFFLIN  3,486,032
APPARATUS FOR MEASURING SPEED COMPRISING A
LIGHT-ELECTRIC TRANSLATING DEVICE
Filed July 14, 1967

INVENTOR
Maurice Harold Cufflin
BY
Baldwin Wight Diller & Brown
ATTORNEYS

United States Patent Office 3,486,032
Patented Dec. 23, 1969

3,486,032
APPARATUS FOR MEASURING SPEED COMPRISING A LIGHT-ELECTRIC TRANSLATING DEVICE
Maurice Harold Cufflin, Essex, England, assignor to The Marconi Company Limited, London, England, a British company
Filed July 14, 1967, Ser. No. 653,536
Claims priority, application Great Britain, July 19, 1966, 32,308/66
Int. Cl. H01j 39/12
U.S. Cl. 250—211                                    9 Claims

ABSTRACT OF THE DISCLOSURE

In known speed measuring apparatus a pattern of light and shade, having lines transverse to the direction of movement, is projected on the moving member. Reflected light is projected on a photo-electric cell whose output contains a frequency component dependent upon the speed of relative motion of the member and the spacing of the transverse lines. By measuring this frequency the speed can be ascertained. The invention does not project a pattern of light and shade but uses a selenium cell, having a number of equally spaced photo-sensitive lines at right angles to the direction of movement of the member, to receive a beam of light reflected from the moving member. Thus the frequency component is dependent on the speed of movement of the surface of the moving member.

---

Figure 1:
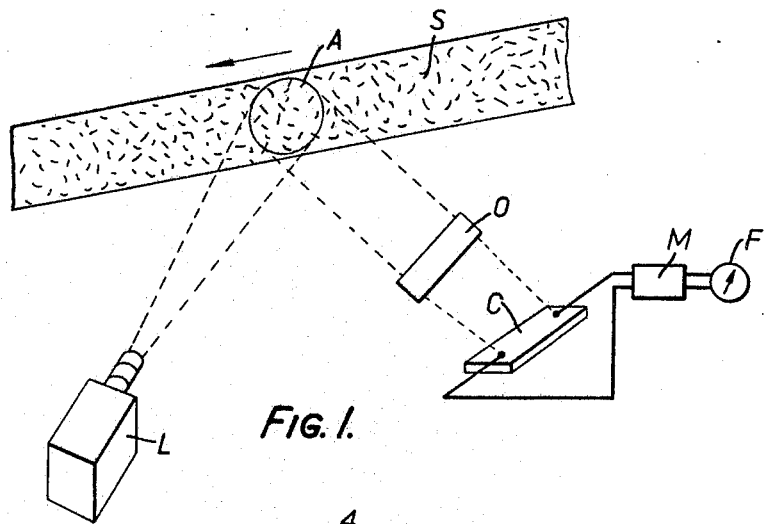

This invention, which is for improvements in or modifications of the invention contained in the co-pending application Ser. No. 558,098, filed June 16, 1966 relates to speed measuring apparatus and, like the parent invention, is especially suitable for speed measurements in industrial processes—for example measurement of the speed of emergence of steel strip from a rolling mill—although it is widely applicable to speed measurement generally, including measurement of vehicle speeds.

According to the parent invention an apparatus for measuring the speed of a moving member in relation to a reference point includes one or more light-electric translating devices; means for subjecting said device or devices to activation by light from a continuously changing area or areas of said member fixed in relation to the reference point; and means for causing the motion of said member in relation to said reference point to modulate the light reaching said device or devices at a rate dependent on the speed of said motion.

In one way of carrying out the parent invention described in the above-mentioned co-pending application a light projector is arranged to project upon the member a pattern of light and shade having lines transverse to the direction of relative movement thereof, light reflected from said member in the area of said pattern being projected upon a photo-electric cell. The electrical output from said cell will contain a major component of a frequency dependent upon the speed of relative motion of said member and upon the spacing, in the direction of relative motion, of the said transverse lines. By measuring, in any convenient known way, the frequency of this component, the relative speed can be ascertained.

The present invention seeks to provide improved speed measuring apparatus operating on the principles set forth in the above-mentioned prior application but which will be simpler than the apparatus actually described therein. In particular the present invention seeks to provide improved speed measuring apparatus wherein an electrical output containing a major frequency component which is dependent upon speed is obtained without optically projecting a pattern of lines of light and shade upon the surface whose speed is to be measured. By avoiding the need for optically projecting such a pattern of lines, the optical equipment necessary may be considerably simplified and cheapened.

According to this invention an apparatus for measuring the speed of a moving member in relation to a reference point includes at least one light-electric translating device and means for subjecting the same to activation by light from a continuously changing area of said member fixed in relation to said reference point, said device being so constructed and arranged as to present a number of equally spaced photo-sensitive lines to the light from said area, said lines extending at an angle (preferably a right angle) to the direction of movement of the said light in relation to the said device. The "moving member" can be an actual material member (e.g. a moving steel strip) or it can be a mere picture, pattern, or display of light and shade moving over a fixed surface.

In one embodiment of the invention the light-electric translating device is a selenium or similar cell having a number of parallel equally spaced wire or strip electrodes with selenium (or other suitable material, such as doped Germanium, of photo-sensitive resistivity) in the spaces between them, alternate electrodes being connected to one terminal of the cell and the remaining electrodes being connected to the other terminal of said cell.

In another embodiment of the invention the light-electric translating device is a selenium or similar cell having a layer of selenium (or other suitable material of photo-sensitive resistivity) upon which are two electrodes of comb-like form each connected to a different terminal of the cell, the "teeth" of the combs being parallel and uniformly spaced and those of one electrode being interleaved with and spaced from those of the other.

In a third embodiment of the invention the light-electric translating device is a selenium or like cell having a layer of selenium (or other suitable material of photo-sensitive resistivity) on a metal backing electrode and, on the face of said layer remote from said electrode, a second electrode comprising a plurality of equally spaced parallel lines or strips which are connected together.

As will be appreciated, in carrying out the present invention the required major frequency component which is dependent upon speed is obtained in the electrical output from the light-electric translating device because of the effect of the movement of light across the equally spaced photo-sensitive lines presented by said device to the relatively moving light. It is, of course, well known per se to construct a selenium cell of parallel wire or strip electrodes with selenium in the spaces between them. In such known cells, however, no care is taken to ensure equality of spacing of the wire or strip electrodes as is necessary for the purposes of this invention if a reasonably good definite major frequency component dependent upon speed is to be obtained, and, moreover, in such known cells the number of electrodes per unit length (i.e. the dimension at right angles to the direction of extension of the wire or strip electrodes) is considerably below that which will usually be practically necessary in a cell for use in carrying out this invention. To quote typical practical figures for a cell for use in carrying out this invention, the electrodes might be each 0.010″ wide and spaced apart by the same amount. Thus it will be seen that the electrode system of a cell for use in carrying out this invention is far more akin to an optical grating than is the electrode arrangement of a known cell as above mentioned.

Preferably the electrodes of a cell for use in carrying out this invention are constituted by metal bars for example of aluminum or gold, deposited in vacuum on the selenium or other photo-sensitive resistance material.

Figure 2:
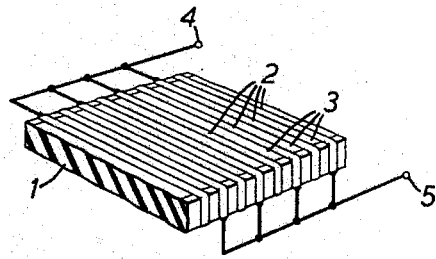
Figure 3:
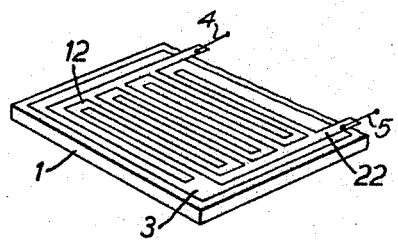
Figure 4:
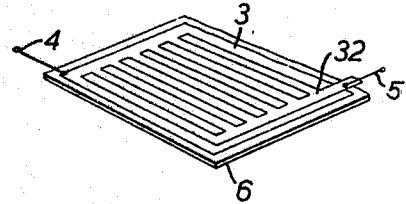

The invention is illustrated in the accompanying drawings in which FIGURE 1 is a general schematic perspective view of one embodiment and FIGURES 2, 3 and 4 show in broken away perspective view three forms of selenium cell suitable for use as the cell C of FIGURE 1. FIGURES 2, 3 and 4 are diagrammatic only, no attempt being made (owing to difficulties of drawing) to show the electrodes or their spacing to scale.

FIGURE 1 is a general view showing the invention applied to the measurement of the speed of a steel strip S emerging from a rolling mill (not shown). A light source L illuminates an area A (shown as a large circular spot but it might be of any suitable convenient shape or size), on the strip. If the strip is hot enough itself to provide sufficient light or radiation to activate the light-electric translating device employed, the source L can be dispensed with. Light from the strip is projected on to a selenium cell C constructed as will hereinafter be described in such manner that its electrical output contains a major frequency component dependent in the speed of movement of the strip. As shown the light is focussed on to the cell C by means of a suitable lens arrangement O. The output from the cell C is amplified by an amplifier M and the speed of movement measured by a frequency meter F which measures the frequency of the aforesaid major component and may be calibrated directly in speed.

One form for the cell C is shown in FIGURE 2. This consists of a back support 1, for example of fibre glass board on which are equally spaced parallel wires or, preferably, deposited metal strip electrodes 2 with selenium 3 between them. The selenium may conveniently be a layer on the board 1 with the electrodes deposited on top of it. Alternate electrodes are connected to one terminal 4 of the cell and the remainder to the other terminal 5. The cell is so positioned that the electrodes extend at right angles to the direction of movement of the strip S (FIGURE 1) as "seen" by the cell.

In the modification shown in FIGURE 3 the electrodes are constituted by the "teeth" of two interleaved deposited metal "combs" 12 and 22 deposited on a layer 3 of selenium on a fibreglass support board 1. One comb is connected to one terminal 4 and the other to the other terminal 5.

In the further modification shown in FIGURE 4 there is only a single metal comb 32 deposited on a layer 3 of selenium which is deposited on a metal back plate (e.g. of brass) 6. The comb is connected to one terminal 5 and the back plate to the other terminal 4.

The selenium cell may be replaced by a cell in which some other suitable material e.g. doped Germanium, of photosensitive resistivity, is used instead of selenium.

In all cases the electrodes are preferably deposited in vacuum and may be, for example, deposited aluminium or gold. To give practical figures for the embodiment of FIGURE 3—the at present preferred embodiment—the base board 1 might be ½" to 1" square; the layer of selenium might be 0.015" thick; and the metal combs might be from 0.001" to 0.002" thick, each comb "tooth" being 0.010" wide and the spacing between adjacent interleaved teeth (one on each comb) being also 0.010".

In the illustrated embodiment of FIGURE 1 the moving member whose speed is to be measured—the steel strip S—is an actual material member which itself moves in relation to the cell C. Clearly, however, it is not necessary for this to be the case for the "moving member" could be a mere picture or pattern or design of light and shade moving on a fixed surface. Thus, for example, the said "moving member" could be a light and shade picture or display produced on the screen of a cathode ray tube e.g. a P.P.I. radar display. Obviously the apparatus of FIGURE 1 would measure the speed of movement of such a display in a particular direction across the screen of the display tube although the tube screen itself did not move.

I claim:
1. An apparatus for measuring the speed of a subject moving in relation to a reference point comprising, in combination, at least one light-electric translation device at said reference point, means for subjecting said device to activation by light from a continuously changing area of said subject fixed in relation to said reference point, said device having a number of equally spaced photo-sensitive lines arranged to receive light from said continuously changing area, said lines extending at an angle to the direction of movement of said subject in relation to said device, means for combining output signals from individual ones of said number of equally spaced photo-sensitive lines to provide a combined output signal from the device, and means for measuring the frequency of a speed representative major component of noise modulation present in the combined output signal from said device.

2. Apparatus as claimed in claim 1 wherein said angle is a right angle.

3. Apparatus as claimed in claim 1 wherein the means for subjecting said device to activation comprise means for subjecting said device to activation by light from a continuously changing area of a moving material member.

4. Apparatus as claimed in claim 1 wherein the means for subjecting said device to activation comprise means for subjecting said device to activation by light from a continuously changing area of a picture, pattern, or display of light and shade moving over a fixed surface.

5. Apparatus as claimed in claim 1 wherein the at least one light-electric translating device is at least one selenium or similar cell having a layer of selenium upon which are two electrodes of comb-like form each connected to a different terminal of the cell, the "teeth" of the combs being parallel and uniformly spaced and those of one electrode being interleaved with and spaced from those of the other.

6. Apparatus as claimed in claim 1 wherein the at least one light-electric translating device is at least one selenium or similar cell having a member of parallel equally spaced wire or strip electrodes with selenium or other photosensitive material in the spaces between them, alternate electrodes being connected to one terminal of the cell and the remaining electrodes being connected to the other terminal of said cell.

7. Apparatus as claimed in claim 6 wherein the electrodes of the cell are constituted by metal bars deposited in vacuum on the selenium or other photo-sensitive resistance material.

8. Apparatus as claimed in claim 1 wherein the at least one light-electric translating device is at least one selenium or like cell having a layer of selenium or the like on a metal backing electrode and, on the face of said layer remote from said electrode, a second electrode comprising a plurality of equally spaced parallel lines or strips which are connected together.

9. Apparatus as claimed in claim 8 wherein the second electrode of the cell is constituted by metal bars deposited in vacuum on the selenium or other photo-sensitive resistance material.

References Cited

UNITED STATES PATENTS

| | | | |
|---|---|---|---|
| 2,930,999 | 3/1960 | Van Santen et al. | 250—211 X |
| 3,399,307 | 8/1968 | Levin | 250—224 |

FOREIGN PATENTS

| | | |
|---|---|---|
| 879,435 | 6/1953 | Germany. |
| 1,067,358 | 1/1954 | France. |

RALPH G. NILSON, Primary Examiner

T. N. GRIGSBY, Assistant Examiner

U.S. Cl. X.R.

250—224; 356—28